United States Patent
Mullapudi et al.

(10) Patent No.: US 9,401,862 B2
(45) Date of Patent: Jul. 26, 2016

(54) OPTIMIZED INTERNET SMALL COMPUTER SYSTEM INTERFACE PATH

(71) Applicant: Dell Products L.P., Round Rock, TX (US)

(72) Inventors: Mohana R Mullapudi, Austin, TX (US); Nam V Nguyen, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 324 days.

(21) Appl. No.: 13/761,837

(22) Filed: Feb. 7, 2013

(65) Prior Publication Data

US 2014/0223027 A1 Aug. 7, 2014

(51) Int. Cl.
*G06F 15/16* (2006.01)
*H04L 12/721* (2013.01)

(52) U.S. Cl.
CPC *H04L 45/66* (2013.01); *Y02B 60/43* (2013.01)

(58) Field of Classification Search
CPC .... Y02B 60/43; H04L 45/66; H04L 67/1097; H04L 12/4625; H04L 49/70
See application file for complete search history.

(56) References Cited

U.S. PATENT DOCUMENTS

| 2010/0094970 | A1 | 4/2010 | Zuckerman et al. | |
|---|---|---|---|---|
| 2010/0153612 | A1* | 6/2010 | Zwisler et al. | 710/313 |
| 2012/0177043 | A1* | 7/2012 | Berman | 370/392 |
| 2012/0297052 | A1* | 11/2012 | Qin et al. | 709/224 |

OTHER PUBLICATIONS

Beckman, The essential guide to loessless iscsi, Jul. 2011.*
Perlman et al., Rbridges: Base protocol specification draft-ietf-trill-rbridge-protocol-99.txt, trill working group, internet draft, Nov. 2006.*
Touch et al., Transparent interconnection of lots of links (trill): problem and applicability statement, network working group, request for comments: 5556, May 2009.*
Perlman et al., Introduction on trill, internet protocol journal, vol. 14, No. 3, Dec. 2011.*
Perlman et al., Routing bridges (rbridges): base protocol specification, interent engineering task force (ietf), request for comments: 6325, Jul. 2011.*
Kurose et al., Computer networking: a top-down approach featuring the internet, 3rd addition, 2005, pp. 354-358.*
Perlman et. al, Routing Bridges (RBridges): Appointed Forwarders, Request for Comments: 6439, Updates: 6325, Category: Standards Track, ISSN: 2070-1721, Nov. 2011, pp. 2 and 12.*
J. Touch et al., Transparent Interconnection of Lots of Links (TRILL): Problem and Applicability Statement, May 2009, www.ietf.org/rfc/rfc5556.txt.
B. Hedlund, Cisco Systems, Inc., Evolving Data Center Switching, May 26, 2010.
DELL, Dell EqualLogic Host Integration Tools, 2012.
DELL, Inside the Dell EqualLogic PS Series iSCSI storage arrays, 2010.

\* cited by examiner

*Primary Examiner* — Ario Etienne
*Assistant Examiner* — Thorne E Waugh
(74) *Attorney, Agent, or Firm* — Terrile, Cannatti, Chambers & Holland, LLP; Stephen A. Terrile

(57) ABSTRACT

A system for optimizing communication paths between two given network ports. More specifically, the system for optimizing communication paths identifies an optimal port between a multi-ported target node and a multi-ported initiator node and then couples the multi-ported target node and the multi-ported initiator node using an optimal path corresponding to the identified optimal port.

12 Claims, 3 Drawing Sheets

OPTIMIZED INTERNET SMALL COMPUTER SYSTEM INTERFACE PATH

BACKGROUND OF THE INVENTION

1. Field of the Invention

The present invention relates to information handling systems and more particularly to information handling systems and more particularly to information handling systems which communicate with an Internet small computer system interface (iSCSI).

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In server type information handling systems and interact protocol (IP) based storage controllers, it is known to implement load balance mechanisms to provide port redundancy and load balancing for network traffic and storage traffic over an IP type communication system. It is known for egress traffic from a host system is load balanced across a plurality of team members with equal priority using a hashing algorithm. For each session that is initiated, a load balancing system (e.g., load balancing software) analyzes usage of the host's physical adapters and establishes the session on one of the physical adapters without considering the physical location of the end node in the network. Basically known load balance mechanisms are substantially solely based on the IP reachability (i.e., is the physical adapter available via an IP address).

However, many known network systems comprise a plurality of communication paths to provide redundancy in the network. With these network systems, a load balancing mechanism does not always provide the shortest path between the nodes. In this situation, the load balancing may not yield the best achievable performance for communication within the network system.

One such network system is identified under the trade designation Dell EqualLogic. Referring to FIG. 1, labeled Prior Art, with a Dell EqualLogic network system array, a plurality of ports of the server type information handling system controller are coupled to two different switches that are then coupled together via an Inter switch link (ISL) which may be a Dell EqualLogic type ISL. Such a topology thus provides redundant paths and services are still available in case of a switch failure. With such a system, a host integration toolkit (such as the EqualLogic Host Integration Tools (HIT) toolkit) contains a connection manager (such as the EqualLogic Host Connection Manager (EHCM)) that can automatically establish iSCSI connections. However, one issue users may encounter is that the connection manager does not have knowledge regarding to which switch fabric each array port is coupled. Thus, with a system having two switches there is only a 50% probability that each connection goes through a particular ISL link. Not having knowledge regarding or being in control to which switch fabric an array port is coupled provides a number of challenges.

For example, one issue relates to bandwidth of the network system. More specifically, in known network systems it is possible that established communication sessions may communicate via a longer ISL link path. The longer ISL link path can then become a bottleneck to the system or may induce a high latency in a configuration with a large number of iSCSI connections (e.g., in a system which includes multiple servers connected to multiple arrays). Improving ISL bandwidth can become even important when performing input/output (I/O) consolidation operations. Another issue relates to I/O errors within the network system. A switch failure can cause the ISL to fail which can then cause I/O communications from both paths to fail. This may result in transient I/O errors being reported back to the operating system (OS) and applications. Some applications can manage the errors and retry the communication, but some cannot.

SUMMARY OF THE INVENTION

In accordance with the present invention, a system for optimizing communication paths between two given network ports is set forth. More specifically, the system for optimizing communication paths identifies an optimal port between a multi-ported target node and a multi-ported initiator node and then couples the multi-ported target node and the multi-ported initiator node using an optimal path corresponding to the identified optimal port. More specifically, the system comprises path optimization logic located within the target node. When a connection request is generated by the multi-ported initiator node, the path optimization logic determines a preferred port via which the initiator node should communicate based on network connectivity to provide a shortest communication path. In certain embodiments, the path optimization logic calculates the shortest path using a media access control (MAC) address of the initiated node for the session and the MAC addresses of the target node physical adapters that are part of load balance determination. By providing the path optimization logic, the shortest path between a server and array ports is assured. Additionally, ISL links do not become a bottleneck and a switch failure does not result in transient I/O errors.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 2:
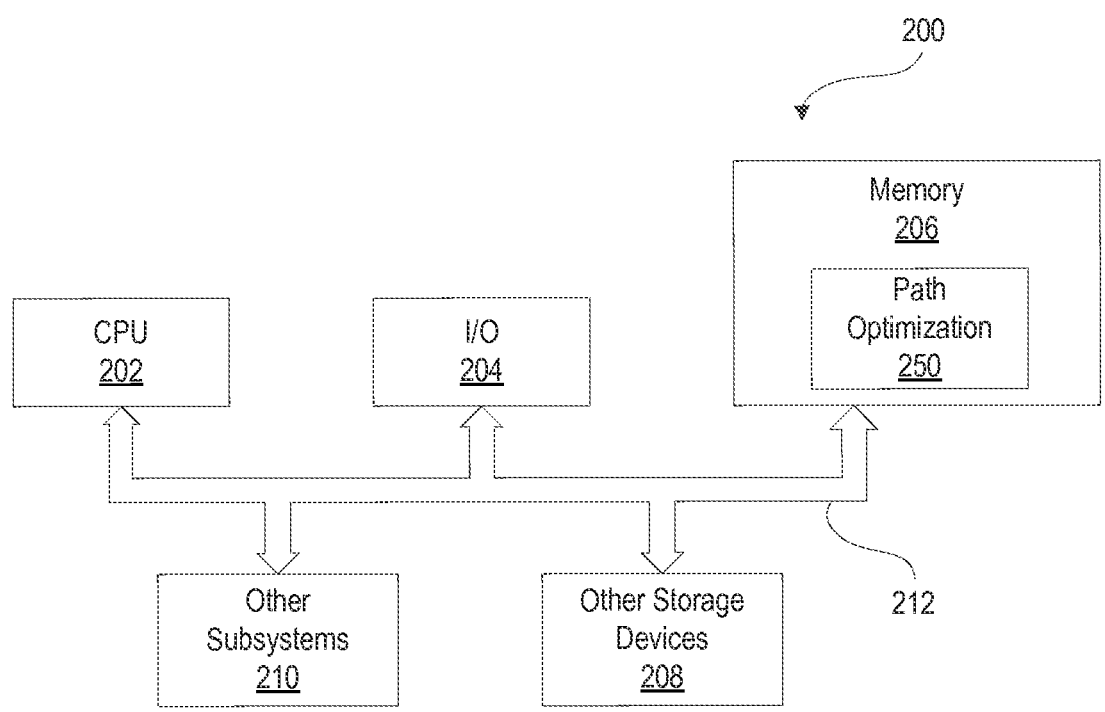
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers (each of which may be coupled remotely to the information handling system 200), a memory 206 including volatile memory such as random access memory (RAM) and non-volatile memory such as a hard disk and drive, and other storage devices 208, such as an optical disk and drive and other memory devices, and various other subsystems 210, all interconnected via one or more buses 212.

In certain embodiments, the information handling system 200 corresponds to a server type information handling system which is included within a network system. The server type information handling system can further include a path optimization system 250 for optimizing communication paths between two given network ports. The path optimization system 250 is stored within the memory 206 as computer program code, the computer program code comprising computer executable instructions which are executable by the processor 202. More specifically, the path optimization system 250 identifies an optimal port between a multi-ported target node and a multi-ported initiator node and then couples the multi-ported target node and the multi-ported initiator node using an optimal path corresponding to the identified optimal port. In certain embodiments, the information handling system corresponds to a target node of the network system and the path optimization system 250 is located within the target node.

In operation, when a connection request is generated by a multi-ported initiator node, the path optimization system 250 determines a preferred port via which the initiator node should communicate based on network connectivity to provide a shortest communication path. In certain embodiments, the path optimization system 250 calculates the shortest path using a media access control (MAC) address of the initiated node for the session and the MAC addresses of the target node physical adapters that are part of load balance determination. For example if the MAC address of the initiated port is 0x0A and the MAC addresses of the target ports are 0x0B and 0x0C, at the time of session establishment, a load balance algorithm calculates path distance metrics between 0x0A and 0x0B and 0x0A and 0x0C. After calculating the path distance metrics, the path optimization system establishes communication sessions with a preferred physical adapter to achieve the shortest communication path for the session.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
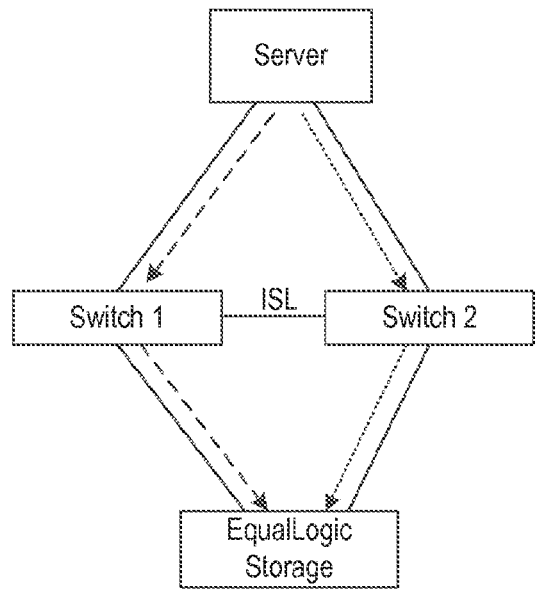
FIG. 1, labeled Prior Art, shows a block diagram of a network system.
Figure 3:
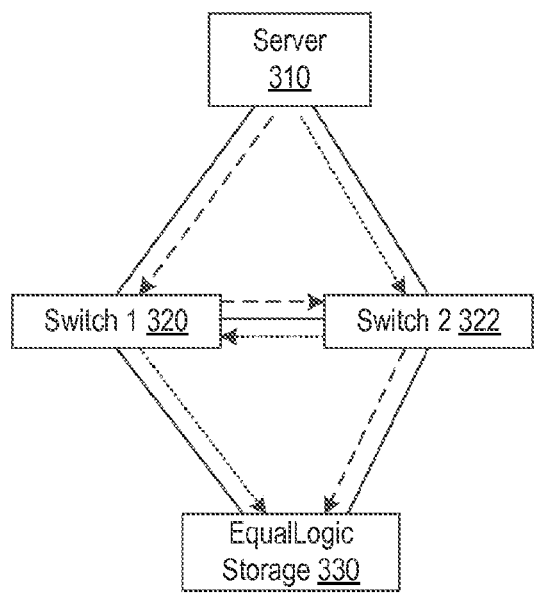
FIG. 3 shows a block diagram of a network system executing a path optimization system.

Referring to FIG. 3 a block diagram of a network system 300 is shown. In certain embodiments the network system 300 comprises a Dell EqualLogic network system. More specifically with the network system 300, a plurality of ports of the server type information handling system controller 310 are coupled to at least two different switches 320, 322 that are then coupled together via an Inter switch link (ISL). The switches are coupled to a storage system 330 which may be a Dell EqualLogic. It will be appreciated that while two switches are shown, network systems often include many such switches. Such a topology thus provides redundant paths and services are still available in case of a switch failure. With such a system, a host integration software (such as the Equallogic Host Integration Tools (HIT) kit) contains a connection manager (such as the EqualLogic Host Connection Manager (EHCM)) that can automatically establish iSCSI connections.

Figure 4:
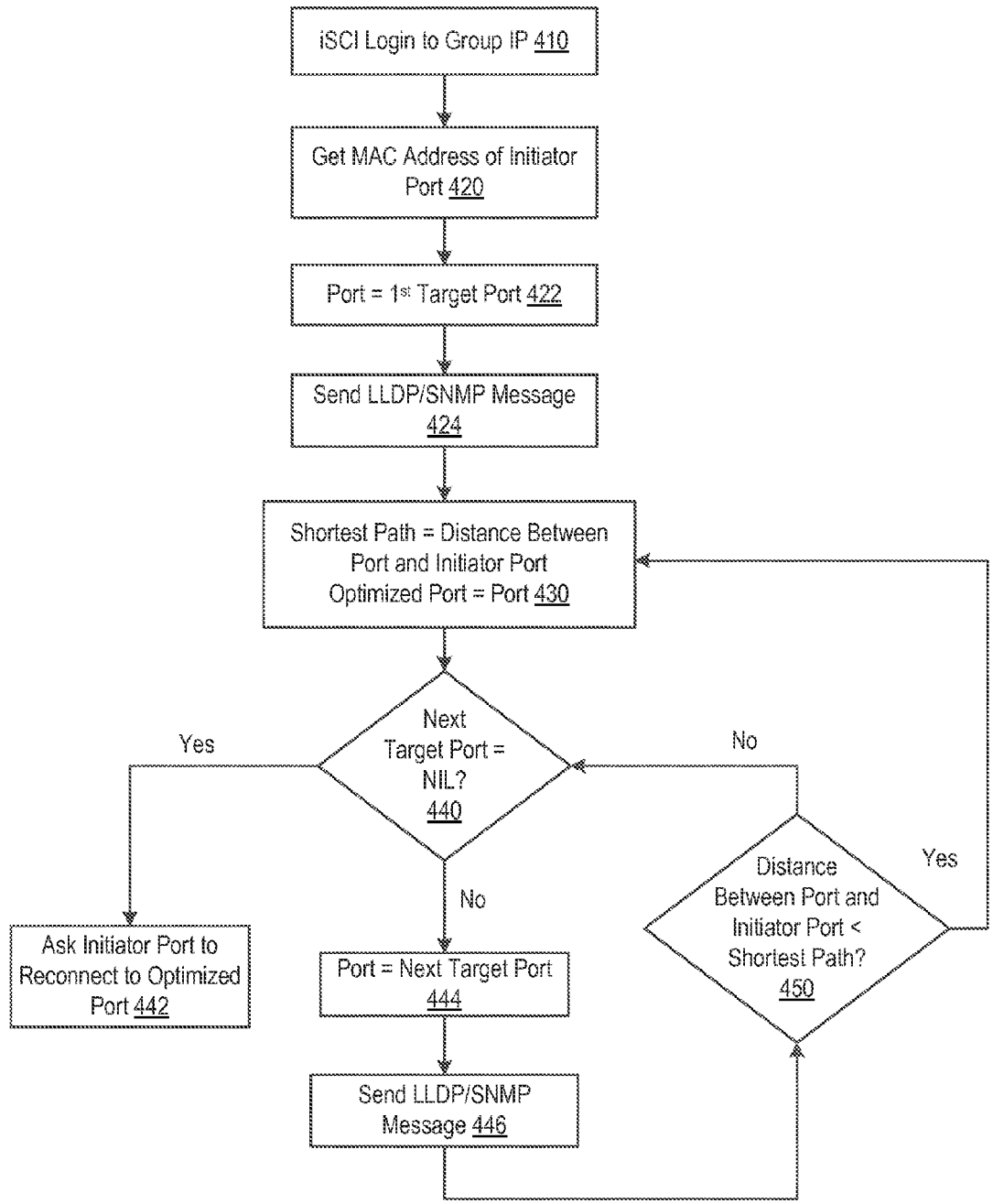
FIG. 4 shows a flow chart of the operation of a path optimization system.

Referring to FIG. 4, a flow chart of the operation of a path optimization system 250 is shown. More specifically, operation of the path optimization system starts when an iSCSI type device logins to a group internet protocol (IP) address at step 410. I.e., a target device accesses the network system. The path optimization system 250 then obtains a MAC address of an initiator port at step 420. This initiator port is then set to equal the first target port at step 422. The initiator port then generates a Link Layer Discovery Protocol LLDP message or Simple Network Management Protocol SNMP type message at step 424. The path optimization system 250 then identifies the path as the shortest physical path between the target port and the initiator port and identifies this path at an optimized path at step 430.

Next, the path optimization system 250 determines whether a next target port is equal to a last target port (e.g., equal to NIL) at step 440. If yes, then the path optimization system 250 request that the initiator port reconnects to the optimized port at step 442. If no, then the path optimization system sets the port equal to the next target port at step 444 and generates a new LLDP or SNMP type message at step 446. The path optimization system then determines whether the distance between the target port and the initiator port is less than the previously identified shortest path distance at step 450. If yes, then the path optimization system returns to step 430 and identifies this new path at the optimized path. If not, then the path optimization system 250 returns to step 440.

The path optimization system 250 uses at least one of a plurality of analysis methods to determine the path distance metrics. For example in certain embodiments, the path optimization system 250 is used within a network system 300 which includes an Immediate Transparent interconnection of Lots of Links (TRILL) enabled switch or switches which conform to the Network Working Group Request for Comment 5556 (IETF RFC5556). The path optimization system 250 communicates with the TRILL enabled switch to determine the path distance metrics for the TRILL enabled switch using a TRILL analysis method. In certain other embodiments, the path optimization system 250 communicates with an external path analysis agent. The external path analysis agent is aware of the network topology as well as the location of MAC addresses. By providing information regarding the location of the MAC addresses within the network the path optimization system 250 can determine the path distance metrics.

More specifically, when performing the TRILL analysis method, because TRILL enabled switches use a link state protocol to carry routing information about MAC addresses of devices coupled to the network, the path optimization system 250 accesses this routing information to identify a shortest path tree for each MAC address on the network. More specifically, at the time of session establishment, a target node generates aLLDP message through all of its ports that are configured for traffic load balance. The LLDP message contains the MAC address of the session initiated node. The TRILL enabled switches contain logic that verifies the provided MAC address in the network and if the MAC address is verified, provides the distance metric information in the form of a HIP message back to the target node. In certain embodiments, the distance metric information includes shortest path cost information. The path optimization system 250 of the target node then establishes a session on the physical port that has been identified as the shortest path to the port of the initiated node. Alternately, the path optimization system 250 moves an established session to the physical port that has the shortest physical path.

When performing the external agent method, the external agent uses (SNMP) to exchange information of the switches in the network. The information about the switches includes information regarding coupled switch neighbors as well as a MAC address table in each of the switches in the network system. In certain embodiments, the MAC address table may be contained within a management suite such as the Dell management suite Advanced Infrastructure Manager (AIM). At the time of session establishment, the target node generates a message with the information regarding the MAC address of the session initiated node and the MAC addresses of the target node physical adapters that are part of a load balance operation. The external agent comprises logic to verify the provided MAC addresses and if the MAC addresses are verified provides the distance metric information to the target node. The path optimization system 250 of the target node then establishes a session on the physical port that has been identified as the shortest path to the port of the initiated node. Alternately, the path optimization system 250 moves an established session to the physical port that has the shortest physical path.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the described embodiment relates to network communications such as iSCSI type network communications, the present invention is equally applicable to any other type of network communications such as network interface controller (NIC) type teaming.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for optimizing communication paths in a network system comprising:
    identifying an optimal port between a multi-ported target node and a multi-ported initiator node;
    coupling the multi-ported target node and the multi-ported initiator node using an optimal path corresponding to the identified optimal port;
    generating a connection request via the multi-ported initiator node;
    determining a preferred port via which the multi-ported initiator node will communicate based on network connectivity to provide a shortest communication path, the shortest communication path being determined based upon path distance metrics, the shortest communication path corresponding to a shortest physical path between an initiator port of the multi-ported initiator node and a target port of the multi-ported target node;
    wherein the network system comprises an Immediate Transparent Interconnection of Lots of Links (TRILL) enabled switch; and
    the path distance metrics are determined using a TRILL analysis operation, the TRILL analysis operation accessing routing information about media access control (MAC) addresses via a link state protocol.

2. The method of claim 1 wherein:
    the multi-ported target node comprises a path optimization system, the path optimization system performing the identifying.

3. The method of claim 1 wherein:
    the identifying further comprises calculating a shortest path using a media access control (MAC) address of an initiated node for the session and a MAC addresses of a target node physical adapter.

4. The method of claim 3 wherein:
    the network system comprises an external path analysis agent, the external path analysis agent being aware of a network topology as well as a location of the initiated node for the session and the target node physical adapter based upon the MAC addresses of the initiated node for the session and the target node physical adapter.

5. An information handling system comprising:
    a processor;
    memory coupled to the processor, the memory storing computer program code, the computer program code comprising computer executable instructions configured for:
        identifying an optimal port between a multi-ported target node and a multi-ported initiator node;
        coupling the multi-ported target node and the multi-ported initiator node using an optimal path corresponding to the identified optimal port; generating a connection request via the multi-ported initiator node;

determining a preferred port via which the multi-ported initiator node will communicate based on network connectivity to provide a shortest communication path, the shortest communication path being determined based upon path distance metrics, the shortest communication path corresponding to a shortest physical path between an initiator port of the multi-ported initiator node and a target port of the multi-ported target node;

wherein the network system comprises an Immediate Transparent Interconnection of Lots of Links (TRILL) enabled switch; and the path distance metrics are determined using a TRILL analysis operation, the TRILL analysis operation accessing routing information about media access control (MAC) addresses via a link state protocol.

6. The information handling system of claim 5 wherein:
the multi-ported target node comprises a path optimization system, the path optimization system performing the identifying.

7. The information handling system of claim 5 wherein:
the identifying further comprises calculating a shortest path using a media access control (MAC) address of an initiated node for the session and a MAC addresses of a target node physical adapter.

8. The information handling system of claim 7 wherein:
the network system comprises an external path analysis agent, the external path analysis agent being aware of a network topology as well as a location of the initiated node for the session and the target node physical adapter based upon the MAC addresses of the initiated node for the session and the target node physical adapter.

9. A non-transitory computer-usable medium embodying computer program code, the computer program code comprising computer executable instructions configured for:
identifying an optimal port between a multi-ported target node and a multi-ported initiator node;

coupling the multi-ported target node and the multi-ported initiator node using an optimal path corresponding to the identified optimal port;

generating a connection request via the multi-ported initiator node;

determining a preferred port via which the multi-ported initiator node will communicate based on network connectivity to provide a shortest communication path, the shortest communication path being determined based upon path distance metrics, the shortest communication path corresponding to a shortest physical path between an initiator port of the multi-ported initiator node and a target port of the multi-ported target node;

wherein the network system comprises an Immediate Transparent Interconnection of Lots of Links (TRILL) enabled switch; and the path distance metrics are determined using a TRILL analysis operation, the TRILL analysis operation accessing routing information about media access control (MAC) addresses via a link state protocol.

10. The non-transitory computer usable medium of claim 9, wherein:
the multi-ported target node comprises a path optimization system, the path optimization system performing the identifying.

11. The non-transitory computer usable medium of claim 9, wherein:
the identifying further comprises calculating a shortest path using a media access control (MAC) address of an initiated node for the session and a MAC addresses of a target node physical adapter.

12. The non-transitory computer usable medium of claim 11, wherein:
the network system comprises an external path analysis agent, the external path analysis agent being aware of a network topology as well as a location of the initiated node for the session and the target node physical adapter based upon the MAC addresses of the initiated node for the session and the target node physical adapter.

* * * * *